(12) United States Patent
Kurapati et al.

(10) Patent No.: US 7,933,985 B2
(45) Date of Patent: Apr. 26, 2011

(54) SYSTEM AND METHOD FOR DETECTING AND PREVENTING DENIAL OF SERVICE ATTACKS IN A COMMUNICATIONS SYSTEM

(75) Inventors: Krishna Kurapati, Richardson, TX (US); Sachin Joglekar, Richardson, TX (US)

(73) Assignee: Sipera Systems, Inc., Richardson, TX (US)

( * ) Notice: Subject to any disclaimer, the term of this patent is extended or adjusted under 35 U.S.C. 154(b) by 1589 days.

(21) Appl. No.: 10/917,771

(22) Filed: Aug. 13, 2004

(65) Prior Publication Data

US 2006/0036727 A1 Feb. 16, 2006

(51) Int. Cl.
*G06F 15/173* (2006.01)
*G06F 21/06* (2006.01)
(52) U.S. Cl. .................... 709/224; 709/225; 370/230
(58) Field of Classification Search .................. 709/224, 709/225; 370/230
See application file for complete search history.

(56) References Cited

U.S. PATENT DOCUMENTS

| | | | |
|---|---|---|---|
| 5,581,610 A | 12/1996 | Hooshiari | |
| 5,751,964 A * | 5/1998 | Ordanic et al. | 709/224 |
| 6,137,782 A | 10/2000 | Sharon et al. | |
| 6,363,065 B1 | 3/2002 | Thornton et al. | |
| 6,598,183 B1 | 7/2003 | Grieco et al. | |
| 6,633,835 B1 * | 10/2003 | Moran et al. | 702/190 |
| 6,665,293 B2 | 12/2003 | Thornton et al. | |
| 6,757,823 B1 | 6/2004 | Rao et al. | |
| 6,769,016 B2 | 7/2004 | Rothwell et al. | |
| 6,781,955 B2 | 8/2004 | Leung | |
| 6,842,449 B2 | 1/2005 | Hardjono | |
| 7,092,357 B1 * | 8/2006 | Ye | 370/230 |
| 7,107,061 B1 * | 9/2006 | Tontiruttananon et al. | 455/453 |
| 2002/0083175 A1 * | 6/2002 | Afek et al. | 709/225 |
| 2002/0129236 A1 | 9/2002 | Nuutinen | |
| 2003/0009699 A1 | 1/2003 | Gupta et al. | |
| 2003/0125087 A1 * | 7/2003 | Shimizu | 455/561 |
| 2004/0042470 A1 | 3/2004 | Cooper et al. | |
| 2004/0083299 A1 | 4/2004 | Dietz et al. | |
| 2004/0086093 A1 | 5/2004 | Schranz | |
| 2004/0161086 A1 | 8/2004 | Buntin et al. | |
| 2004/0260560 A1 | 12/2004 | Holloway et al. | |
| 2005/0132060 A1 | 6/2005 | Mo et al. | |
| 2005/0201363 A1 | 9/2005 | Gilchrist et al. | |
| 2005/0249214 A1 | 11/2005 | Peng | |
| 2005/0259667 A1 | 11/2005 | Vinokurov et al. | |
| 2006/0028980 A1 | 2/2006 | Wright | |

(Continued)

OTHER PUBLICATIONS

Commercial Libraries, Data Compression—Speech, http://datacompression.info/Speech.shtml, accessed May 2005.

(Continued)

*Primary Examiner* — Larry Donaghue
*Assistant Examiner* — Asghar Bilgrami
(74) *Attorney, Agent, or Firm* — Chalker Flores, LLP; Daniel J. Chalker; Edwin S. Flores

(57) ABSTRACT

A method and system are provided for use in detecting and preventing attacks in a communications network. In one example, the method includes calculating first and second traffic volumes based on messages received at a first time and a second time, respectively. An average acceleration is calculated based on the first and second traffic volumes, and the method identifies whether the average acceleration has crossed a threshold. The messages are serviced only if the average acceleration has not crossed the threshold.

21 Claims, 8 Drawing Sheets

U.S. PATENT DOCUMENTS

| | | | |
|---|---|---|---|
| 2006/0288411 | A1 | 12/2006 | Garg et al. |
| 2007/0076853 | A1 | 4/2007 | Kurapati et al. |
| 2007/0121596 | A1 | 5/2007 | Kurapati et al. |
| 2007/0204060 | A1 | 8/2007 | Higuchi et al. |
| 2008/0016334 | A1 | 1/2008 | Kurapati et al. |
| 2008/0016515 | A1 | 1/2008 | Naim et al. |

OTHER PUBLICATIONS

Data Compression Download Source Codes and Papers. http://www.data-compression.com/download.shtml, accessed May 2005.

ITU-T. Recommendation G.191, Software Tool Library 2000 User's Manual. ITU, Geneva, Dec. 2000.

ITU-T. Recommendation G.711, Pulse code molulation (PCM) of voice frequencies, vol. Fascicle III.4 of Blue Book, pp. 175-184. ITU, Geneva, 1989.

ITU-T. Recommendation G.729, Coding of Speech at 8 kbps using Conjugate-Structure Algebraic-Code-Excited Linear-Prediction (CS-ACELP). ITU, Geneva, Mar. 1996.

Speech Compression, http://www.data-compression.com/speech.shtml, accessed May 2005.

Stein, L. D. and Stewart, J. N., "The World Wide Web Security FAQ, Version 3.1.2, Feb. 4, 2002," http://www.w3.org/Security/Faq/.

US Congress, CAN-SPAM Act of 2003, http://www.spamlaws.com/federal/108s877.shtml.

International Search Report and Written Opinion of the International Searching Authority for PCT/US2006/035903 dated Apr. 23, 2007.

International Search Report and Written Opinion of the International Searching Authority for PCT/US2006/031499 dated May 24, 2007.

International Search Report and Written Opinion for PCT/US2007/014871 dated Sep. 11, 2008.

Hidden Markov Model Toolkit, http://htk.eng.cam.ac.uk/; Sep. 9, 2005; accessed though www.archive.org on Jul. 9, 2007.

http://www.bell-labs.com/project/tts/voices.html; Sep. 11, 2005; accessed though www.archive.org on Jul. 9, 2007.

http://www.dli2.nsf.gov/; Nov. 28, 2003.

http://www.ipodder.org/; Sep. 4, 2005; accessed though www.archive.org on Jul. 9, 2007.

http://www.microsoft.com/reader/developers/downloads/tts.asp; Sep. 8, 2005; accessed though www.archive.org on Jul. 9, 2007.

http://www.naturalvoices.att.com/; Sep. 13, 2005; accessed though www.archive.org on Jul. 9, 2007.

Tyson, Jeff and Valdes, Robert, "How VoIP Works" http://computer.howstuffworks.com/ip-telephony.htm; Sep. 23, 2006; accessed though www.archive.org on Jul. 9, 2007.

\* cited by examiner

SYSTEM AND METHOD FOR DETECTING AND PREVENTING DENIAL OF SERVICE ATTACKS IN A COMMUNICATIONS SYSTEM

BACKGROUND

A communications system, particularly one connected to a publicly accessible network, generally has flaws that can be exploited to render all or portions of the system unusable. For example, a Denial of Service (DoS) attack is designed to flood a target packet network or device with traffic in order to render the target unusable by legitimate users. Such attacks may be based on exploiting a vulnerability in the system (e.g., a limitation in a network protocol such as TCP/IP) or may be based on exhausting system resources. In the latter case, the amount of traffic is intended to overwhelm the target and prevent the target from handling legitimate traffic. For example, if a user attempts to contact a server that is the target of an ongoing DoS attack, the server may be overwhelmed by the traffic and unable to respond to the user's request. Such attacks frequently disable the target until the attack ends, and may be launched against a variety of services, including voice-over-IP (VoIP), instant messaging, and other packet based services. DoS attacks may even be targeted against a particular user of a system if certain information about the user (e.g., VoIP phone number or instant messaging user name) is known.

Accordingly, what is needed is an improved system and method for addressing these issues.

DETAILED DESCRIPTION

Figure 1:
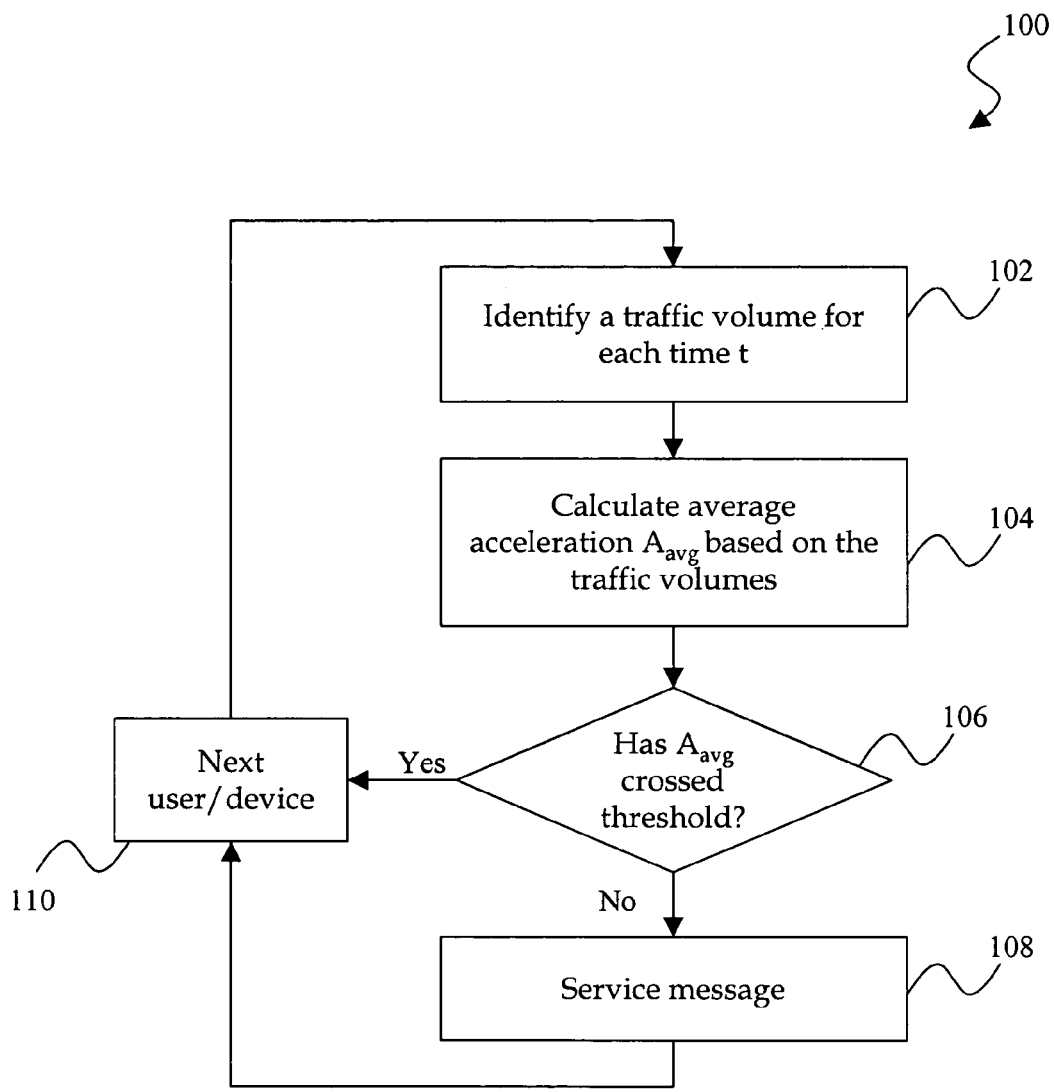
FIG. 1 is a flowchart of one embodiment of a method for detecting a denial of service attack in a communications system.

This disclosure relates generally to communications systems and, more specifically, to a system and method for detecting and preventing denial of service attacks. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a method 100 enables the detection and prevention of denial of service (DoS) type attacks in a communication system. Although some DoS attacks may be detected based on a flood of traffic, other attacks may be based on stealth. Such stealth attacks may be particularly effective against IP-based voice or instant messaging resources, such as VoIP phones or instant messaging programs. For example, unlike traditional data resources, low volume sustained call traffic may be used to create a DoS attack on a VoIP phone. Although the volume of traffic may not be high enough to register as a DoS flood attack, it may prevent use of the phone by, for example, sending frequent packets requesting connection to the phone. As will be described later in greater detail, the method 100 detects such attacks based on traffic average acceleration, and may be used with systems that include computers, servers, telephones, pagers, personal digital assistants, and other devices susceptible to such DoS attacks.

In step 102, an amount or volume of traffic is identified at multiple times. In the present example, the method 100 identifies a traffic volume for each application, user, or device (e.g., a VoIP telephone), although the traffic may be traffic destined for a particular network or a subnet. Each time at which the traffic volume is sampled may be a predefined time following the previous time (e.g., $\Delta t$). In step 104, an average acceleration $A_{avg}$ is calculated based on the traffic volumes. A more detailed example of these calculations will be provided later.

In step 106, a determination is made as to whether $A_{avg}$ has crossed a threshold. For example, a threshold value may be established based on system characteristics (amount of traffic, etc.) and the threshold may be defined to indicate an excessive amount of traffic (from any source or from a particular source or sources, or to one or more destinations). If $A_{avg}$ has not crossed the threshold, the method 100 continues to step 108, where the messages are serviced. For example, if the message is a session initiation protocol (SIP) INVITE message, then the message would be serviced as is known in the art. After the message is serviced, the method continues to the next user (if the calculations are per user) or device (if the calculations are per device) in step 110. If $A_{avg}$ has crossed the threshold, then an attack may be occurring and the method may continue to step 110 without servicing the message. In some embodiments, the method may also block a source of the traffic or take other action, as will be described later.

Figure 2A:
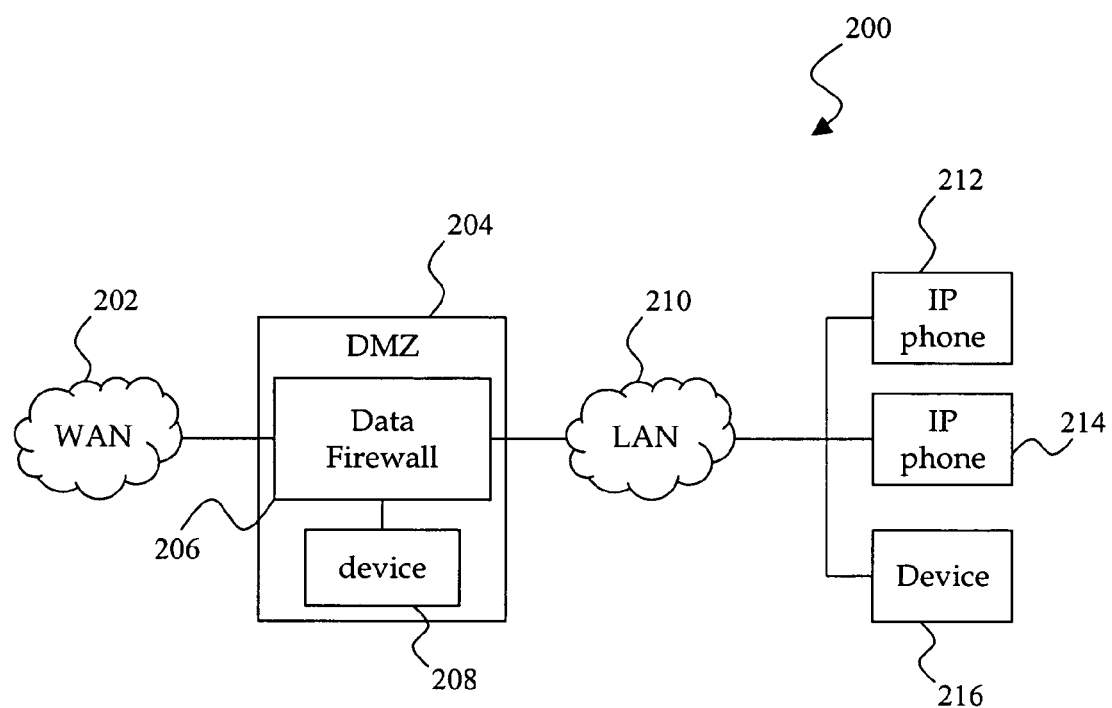
FIG. 2a is a diagram of one embodiment of a communications environment in which the method of FIG. 1 may be executed.

Referring now to FIG. 2a, an exemplary system 200 illustrates one environment within which the method 100 of FIG. 1 may be executed. A wide area network (WAN) 202 is connected to a local area network (LAN) 210 via a demilitarized zone (DMZ) 204. The DMZ 204 includes a data firewalling means 206 and a device 208. The LAN 210 is connected to multiple devices, such as IP phones 212 and 214, and a device 216 (e.g., a computer). It is understood that each of the illustrated components of the system 200 may include other components that are not shown. For example, the LAN 210 may include servers, routers, PBXs, voicemail systems, interactive voice response (IVR) systems, etc. Instructions for executing various steps or for implementing various functions disclosed in the present description may be stored on and/or executed by many of the components of the system 200.

Figure 2B:
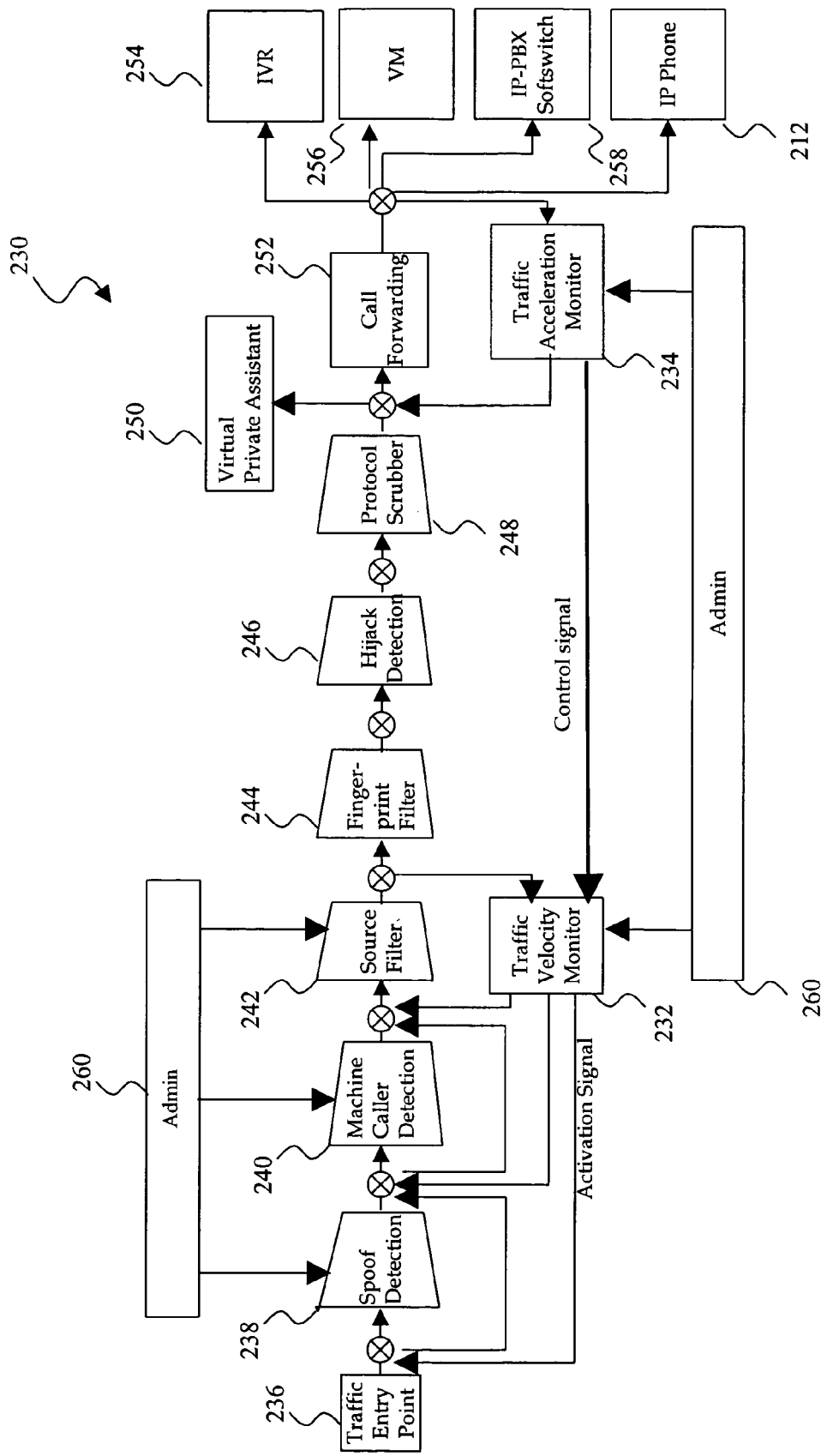
FIG. 2b is a diagram of exemplary components of one embodiment of an architecture that may be implemented within the system of FIG. 2a for detecting and preventing various types of denial of service attacks.

Referring now to FIG. 2b, architecture 230 includes exemplary components that may be implemented within the system of FIG. 2a for detecting and preventing various types of DoS attacks. As will be described later in greater detail, the various components may be used for detecting or preventing one or more different types of attacks, and some components may be used in conjunction with other components. It is understood that, although the present architecture is implemented within the device 208 of FIG. 2a, the components may be distributed throughout the system 200 and may be arranged differently than illustrated in the architecture 230. Furthermore, various components may be added, removed, combined, or further divided. Additionally, functionality provided by the illustrated components may be achieved using a number of different approaches. Accordingly, the particular architecture illustrated in FIG. 2b is one of many possible architectures that may be used to implement the present disclosure.

Traffic moving within the architecture 230 is monitored by one or both of a traffic velocity monitor (TVM) 232 and a traffic acceleration monitor (TAM) 234. Both the TVM 232 and TAM 234 may monitor both the source of traffic (e.g., from outside the system 230) and the traffic's destination (e.g., within the system 230). The monitoring of traffic using the TVM 232 and TAM 234 is described in greater detail below with respect to FIG. 3.

Traffic enters the architecture 230 at an entry point 236. As can be seen by the arrows indicating data flow through the system 200, traffic may pass through a spoof detection (SD) component 238 and/or a machine caller detection (MCD) component 240 before arriving at a source filter (SF) 242. Alternatively, the traffic may pass directly from the entry point 232 to the source filter 242 if the SD 238 and MCD 240 are not active or if some traffic is not being blocked. The source filter 242, which may or may not provide filtering for a particular source, feeds traffic back into the TVM 232 as well as into a fingerprint filter 244. Traffic passes from the fingerprint filter 244 into a hijack detection component 246 and from there into a protocol scrubber (PS) 248. Traffic from the protocol scrubber 248 may pass into a virtual private assistant (VPA) 250 and a call forwarding component 252. The call forwarding component 252 passes traffic into one or more devices or systems, such as an interactive voice response (IVR) system 254, a voicemail system (VM) 256, an IP-PBX softswitch 258, and/or an IP phone (such as the IP phone 212 of FIG. 2a). The call forwarding component also feeds information back into the TAM 234, which sends information to the VPA 250 and the TVM 232. Although the call forwarding component 252 receives mostly legitimate traffic, passing the traffic back into the TAM 234 may aid in the detection of stealth attacks. An administration interface 260 may be used to access and control one or more of the components, such as the TVM 232, the TAM 234, the spoof detection component 238, the machine caller detection component 240, and the source filter 242.

With additional reference to Table 1 (below), the architecture 230 uses the TVM 232, TAM 234, and other components to identify the occurrence of DoS attacks and prevent such attacks, including attacks from a single source and attacks from multiple sources (distributed DoS (DDOS) attacks). Various attacks are illustrated in Table 1 (below) along with the components of the architecture 230 that may be used to detect and prevent each attack.

TABLE 1

|  | DoS (single source) | | DDoS (multiple source) | |
| --- | --- | --- | --- | --- |
|  | Detect | Prevent | Detect | Prevent |
| Flood Zombie | TVM | SF | TVM | MCD |
| Flood Spoofed | TVM | SF | TVM | SD |
| Stealth Zombie | TAM | SF | TAM | MCD |
| Stealth Spoofed | TAM | SF | TAM | SD |
| Stealth Human | TAM | SF | TAM | VPA |
| Malicious Formatting | PS | PS | n/a | n/a |
| Call hijacking/Call shut-down | FF | FF | n/a | n/a |

As described previously, a flood attack uses one or more machines to launch an attack based on overwhelming traffic volume. A zombie attack is launched from one or more compromised machines (e.g., zombies). A spoofed attack falsifies the attack's source to make it appear that the attack is being launched from a different source. A malicious formatting attack exploits vulnerabilities in formatting and protocols. Call hijacking and call shut-down attacks disrupt or gain control of a call by intercepting messages and/or relaying false messages to control or terminate an ongoing communication session. Various combinations of these attacks can be used, as illustrated in Table 1. It is noted that the term "call" includes many message and messaging types in the present disclosure, including voice calls, instant messages, pages, etc.

Turning now to a more detailed description of various components of the architecture 230, the TVM 232 and TAM 234 provide traffic monitoring capabilities (for both source and destination) for many types of attacks, with additional detection capabilities provided by the fingerprint filter 240 and the protocol scrubber 244. Generally, the TVM 232 and TAM 234 interact with and utilize other components of the architecture 230 to stop or prevent an attack that they detect.

Figure 3:
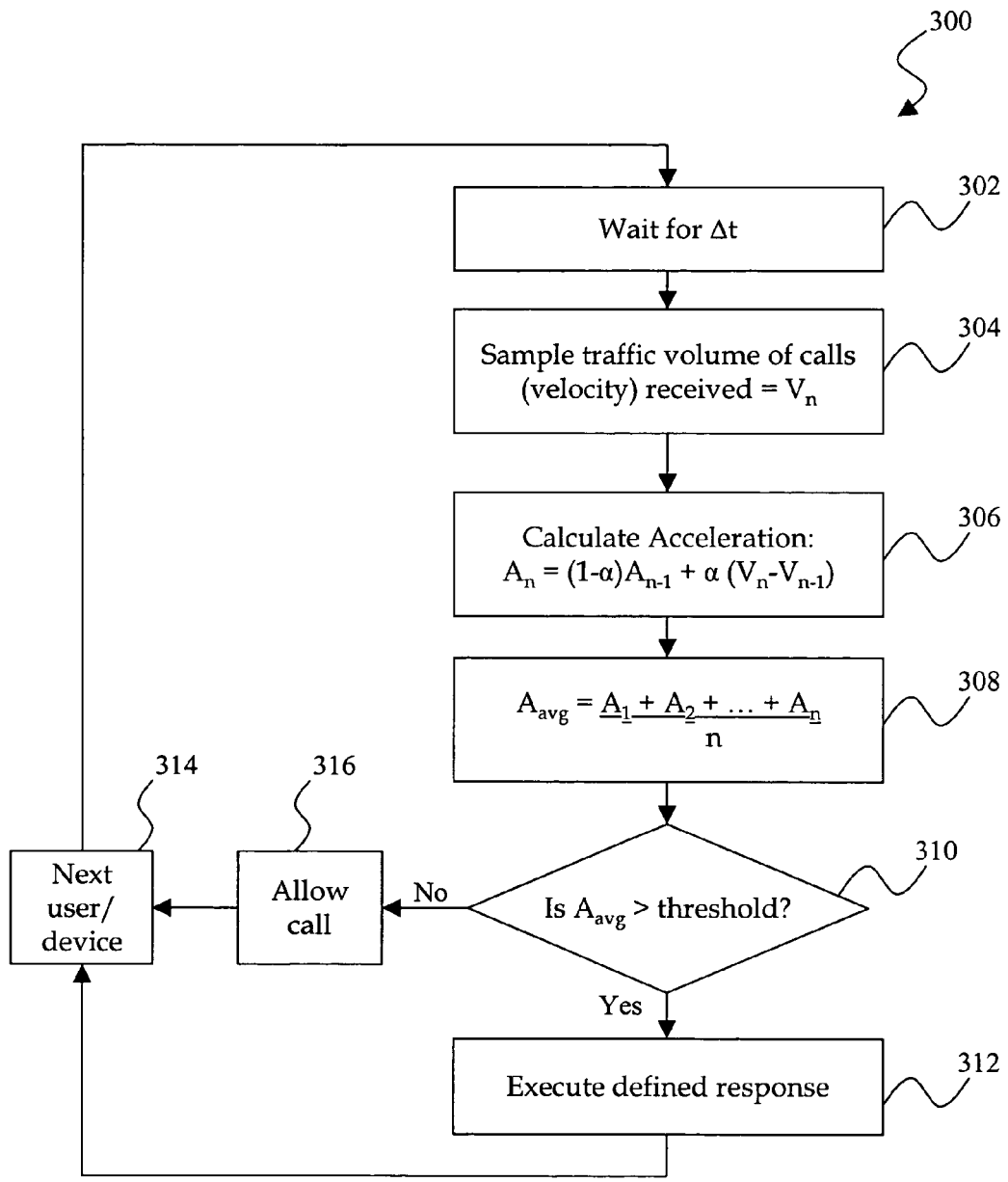
FIG. 3 is a flowchart of a more specific example of the method of FIG. 1.

Referring to FIG. 3 and with additional reference to FIGS. 4-8, in one embodiment, a method 300 illustrates how an attack may be detected using functionality provided by the TVM 232 and TAM 234 of FIG. 2b. An attack against the IP phone 212 of FIG. 2a will be used for purposes of illustration, although it is understood that the present example is equally applicable to many of the components of the system 200. Typically, all traffic may be stopped by a perimeter security device (e.g., the device 208 of FIG. 2) when it is determined that the traffic volume is above a predefined threshold. Such a response may be invoked to counter the potential denial of service that could result from such a traffic volume. However, blocking all traffic prevents legitimate calls from being serviced and so is generally undesirable. Accordingly, the method 300 enables the detection and blocking of attacks, while permitting legitimate traffic to be serviced.

Figure 4:
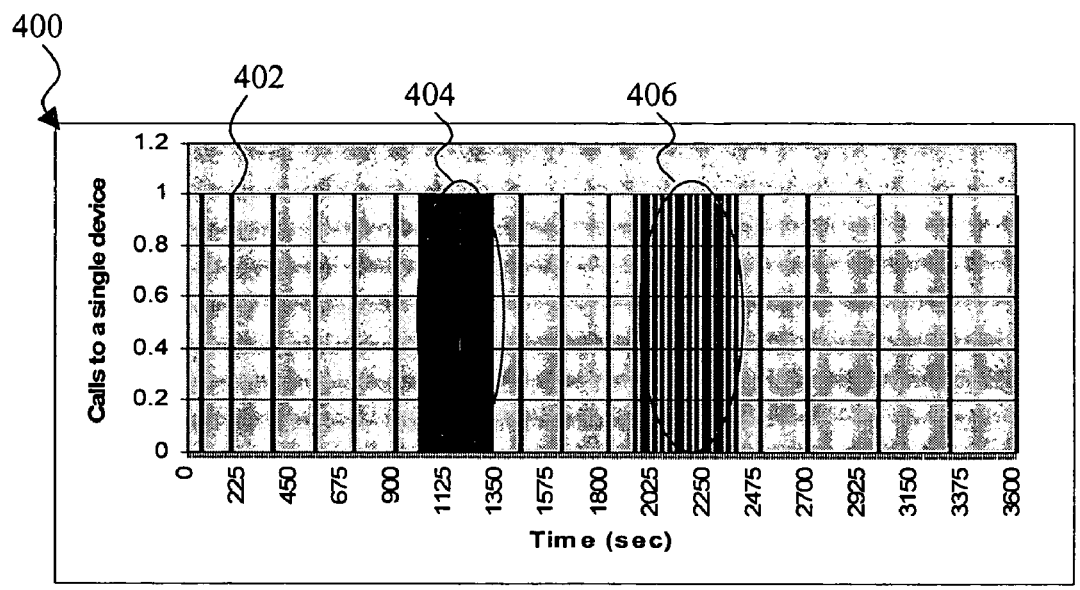
FIG. 4 is a graph of exemplary call statistics.
Figure 5:
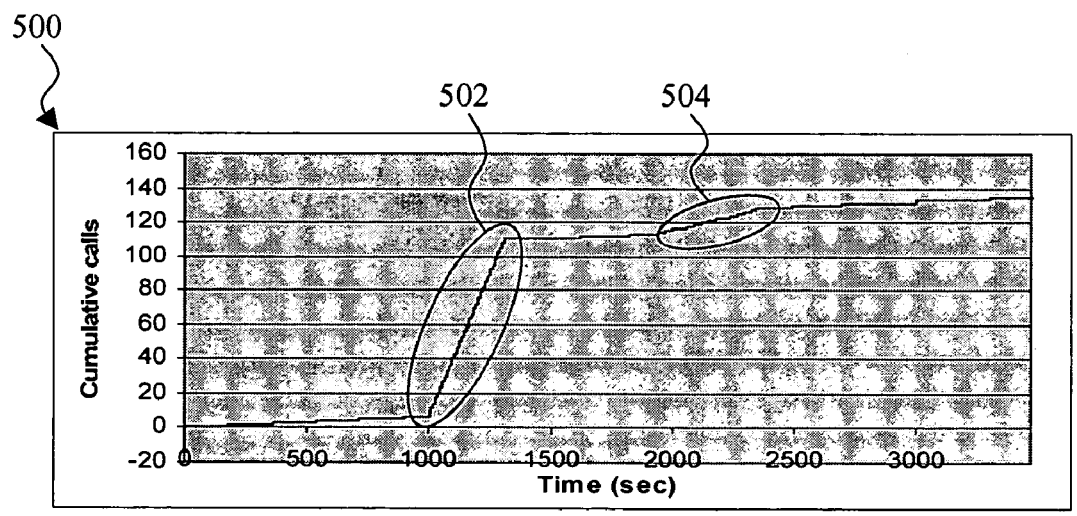
FIG. 5 is a graph of cumulative calls corresponding to the graph of FIG. 4.

As illustrated in graph 400 of FIG. 4, call statistics indicate a number of calls directed to the phone 212 over a period of time (3504 seconds or 58.4 minutes in the present example). Each call is represented by a vertical bar 402. In the present example, the statistics indicate that one sequence of calls was received within a fairly short period of time (represented by the oval 404) and occurred with few or no intervening pauses. Another sequence of calls was received later within another relatively short period of time (designated by the oval 406), but these calls were generally separated by a brief time interval. As illustrated by the cumulative calls in graph 500 of FIG. 5, the total number of calls jumps sharply in conjunction with the first sequence of calls (as represented by the oval 502 in FIG. 5) and increases gradually with the second sequence of calls (as represented by the oval 504).

In step 302, the method 300 waits for a predefined period of time Δt, which may be a configurable period of time defined in seconds. In step 304, a traffic velocity $V_n$ is sampled at the end of Δt by the TVM 232. The velocity $V_n$ represents an amount of traffic destined for the IP phone 212 at the $n^{th}$ sampling time.

Figure 6:
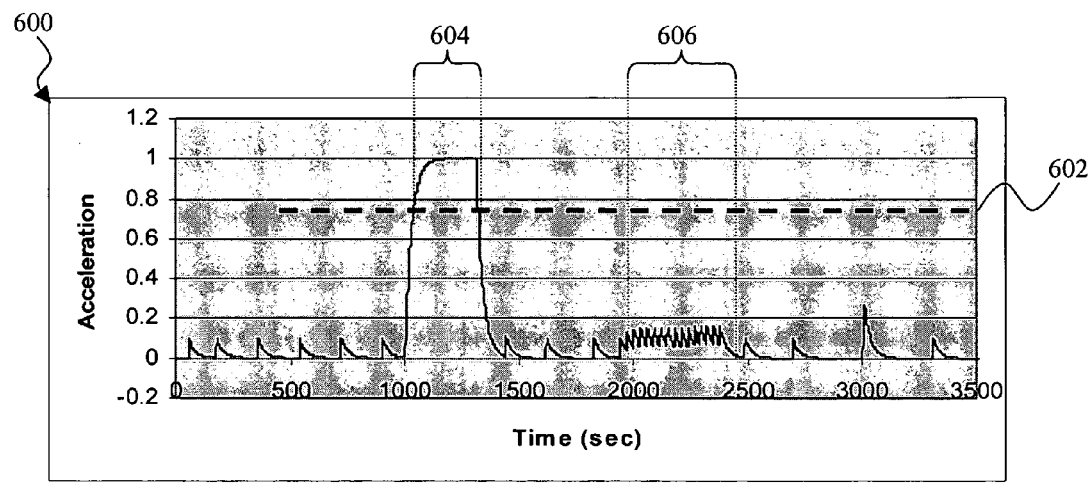
FIG. 6 is a graph of call acceleration corresponding to the graph of FIG. 4.

In step 306 and with reference to FIG. 6, an acceleration $A_n$ is calculated for the nit sampling time using the equation:

$$A_n = (1-\alpha)A_{n-1} + \alpha(V_n - V_{n-1})$$

where α is a sensitivity factor that may be used to adjust the sensitivity of $A_n$ with respect to recent changes in velocity $(V_n - V_{n-1})$. As can be seen by the equation, the acceleration is based on the rate of change of the traffic velocity $V_n$. However, the acceleration $A_n$ (e.g., absolute acceleration) may not detect low volume sustained call traffic to the phone 212 because such acceleration may remain below the threshold. As illustrated by graph 600 of FIG. 6, relatively high volume (e.g., flood type) traffic may cross a threshold 602 defining the occurrence of a flood type DoS attack. This type of traffic is indicated by reference numeral 604. As noted below with respect to FIG. 7, when this type of high volume traffic is detected by the architecture 230, it may be locked down to prevent it from crossing the threshold. However, low volume sustained traffic (represented by reference numeral 606) may not cross the threshold, and so monitoring $A_n$ may not be sufficient to identify stealth DoS attacks.

Figure 7:
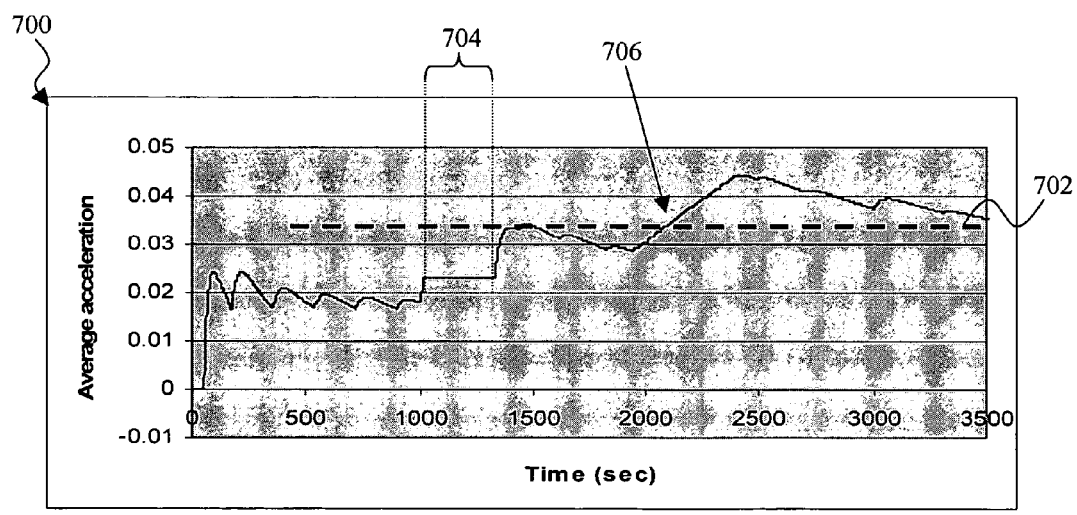
FIG. 7 is a graph of average acceleration corresponding to the graph of FIG. 4.

In step 308 and with reference to FIG. 7, an average acceleration $A_{avg}$ is calculated by the TAM 234 using the equation:

$$A_{avg} = \frac{A_1 + A_2 + \ldots + A_n}{n}$$

The average acceleration $A_{avg}$ will increase over time and eventually exceed the threshold unless the attack stops beforehand. As illustrated in graph 700 of FIG. 7, the call traffic (represented by reference numeral 704) that exceeded the threshold 602 in FIG. 6 has been locked down so that it will remain below the threshold and not appear as stealth attack traffic. Other call traffic (e.g., the traffic not specifically identified as 704 or 706) remains under the threshold 702 as the time between calls prevents the traffic's acceleration from reaching the threshold 702. However, the stealth-type call traffic 606 (FIG. 6) that remained below the threshold when viewed from a volume perspective has crossed the threshold 702 at point 706 as its acceleration has increased. Accordingly, $A_{avg}$ takes advantage of the ability to analyze the traffic history of the phone 212 to detect stealth attacks, such as may be represented by the low volume sustained traffic 406 of FIG. 4.

In step 310, a determination is made as to whether $A_{avg}$ has exceeded the threshold (e.g., the threshold 702). If $A_{avg}$ has exceeded the threshold 702, then the method continues to step 312, where the call is blocked. For example, in the case of a single source attack, traffic from the call source may be added to a blocked list or short-term cache associated with the source filter 242 (FIG. 2b) by either the TVM 232 or TAM 234 until it is determined that the attack has ended. For multiple source attacks, the TVM 232 or TAM 234 may be used in conjunction with the spoof detection component 238 or the MCD 240, as illustrated in Table 1. The method then proceeds to step 314 and performs the same analysis for the next user or device. If $A_{avg}$ has not exceeded the threshold 702, the method continues to step 316, where it allows the call (or other service that has been requested), and then continues to step 314 as previously described.

Referring again to FIG. 2b, the spoof detection component 238 enables the architecture 230 to identify attacks from spoofed sources. For example, the source of each call may generally be examined and the average acceleration of calls from a single source or a group of sources may be calculated independently of other calls received at approximately the same time. This allows legitimate calls to pass while suspect calls are blocked. However, an attacker may arrange to bypass such filtering by spoofing the source information or by compromising multiple "zombie" machines to use in a distributed denial of service (DDoS) attack in order to evenly distribute the attack sources and circumvent the stealth attack detection (as described later with respect to the machine caller detection component 240).

Spoofing may be accomplished when calling VoIP phones by, for example, injecting false caller identification information into the call stream. Such spoofing may potentially circumvent list-based filtering of callers that an administrator or user may set up. To detect such spoofing, the spoof detector component 238 may assume that the caller-id is correct and attempt to contact the source of the caller-id for verification. For example, when a call is received with a certain caller-id "x", the system may, before forwarding the call to the called party, verify that "x" is indeed the calling party by sending a special spoof detection message to "x". Spoofing may be detected based on the response that is received from "x". It is understood that such detection may be combined, for example, with the method 300 of FIG. 3.

Machine caller detection provided by the MCD component 240 enables the detection and prevention of attacks from machine dialed sources, such as zombie machines, as opposed to human dialed calls or messages. For example, in a VoIP or instant messaging environment, a machine call detection process may be used to identify machine dialed calls and then handle the calls as per user's defined preferences. For example, upon receipt of a SIP INVITE message, the receiving device may respond and require that the calling party enter some type of authentication sequence (e.g., a specific sequence of numbers), respond to a context sensitive challenge (e.g., press a designated number to reach an operator), or perform a simple task (e.g., enter the result of a simple computation or enter the numbers corresponding to a word). The receiving device may then wait for a period of time. At the expiration of the time period, if no answer (or an incorrect answer) has been received from the calling party, the receiving device may take appropriate action (e.g., blocking the calling party, routing the party to voicemail, or hanging up as defined per user preferences). If the proper response is received, then the call or instant message may be allowed.

The source filter 242 provides a means for sources identified as attack sources to be blocked. For example, a call source may be added to a blocked list or short-term cache associated with the source filter 242. Such a source filter may include a firewall policy that is implemented to expire within a certain period of time (e.g., DoS cache entries may be deleted when the period ends) or may remain in force until cancelled. The short term cache may be used to hold dynamically identified attack sources and to allow identification of legitimate calling parties.

The fingerprint filter 244 may employ content analysis functionality to extract abstract information from protocol messages and message flows (e.g., information identifying that a protocol stack always sends 183 or never sends Invite with SDP) to create a fingerprint of each message generated by a protocol implementation. Generally, a protocol specification is flexible enough to accommodate multiple formats, such as differences in whitespace and/or ordering within a message. Accordingly, each implementation may not build messages in exactly the same format even though the implementations conform to the protocol specification. The fingerprint filter 240 captures and stores subtle differences in message characteristics to protect against mid-session attacks such as call hijacking. Message characteristics that are checked by the fingerprint filter may include number and positioning of whitespaces, user agent identity, field values, field sequencing, field value sequencing, field value formatting, and field value lengths. As it is extremely unlikely that a hijacking machine will display the same fingerprint as one of the legitimate machines involved in a session, the fingerprint filter 240 provides a level of security against hijacking attacks even though no encryption is used.

The hijack detection component 246 provides non-cryptographic protection against malicious call shut-down and call hijacking, and may be used in conjunction with the fingerprint filter 244. A third-party attacker may capture initial messages in a session in order to learn the parameters of the session. The parameters may then be used to inject messages to cause tear-down of the session or to otherwise disrupt the session. Such issues are commonly handled by cryptographically authenticating each message to make sure that it is not forged by a third-party. However, in many VoIP deployments, enforcing cryptographic authentication on all calling parties may not be practical due to the lack of widespread support for such cryptographic methods and the complexity involved in configuring and protecting the private keys needed for cryptographic authentication.

The hijack detection component 246 addresses this by taking advantage of protocol messages. For example, one hijacking attack involves injecting a forged session termination message during session setup. This attack causes premature tearing down of the session, which results in a denial of service to both legitimate parties. The hijack detection component may provide protection from a message, such as a forged BYE, by sending a message within the same dialog and checking the response received from the other end. An attack may be detected because the other end will respond with one type of message if it has sent the BYE, and with another type of message if it has not sent the BYE. A similar process may be used to protect against a forged CANCEL message or other forged messages.

The protocol scrubber 248 provides protection from maliciously formatted messages by filtering out messages that are unacceptable by protected endpoints (e.g., the IP phone 212). Such messages include messages that do not comply with communication protocol specifications, messages that have unacceptable formatting, messages having values of unacceptable lengths, messages having unacceptable characters or character sequences, and messages that contain known malicious formatting. As indicated by the placement of the protocol scrubber 248 within the architecture 230, this filtering may be applied to all otherwise acceptable messages. Benefits of such filtering may include "zero-day" protection from attacks that are based on sending maliciously formatted messages in order to crash a system and cause a denial of service to users. Note that known malicious formatting may include a protocol acceptable message, but the protocol scrubber 248 may be configured to filter out the message if a particular user agent is known to be vulnerable to such formatting (e.g., a name longer than 128 characters). The protocol scrubber may also modify a message to make it acceptable based on an endpoint's requirements. Accordingly, protection may be provided at multiple layers of a protocol stack against attacks.

The VPA 250 may be used to request a call back number for calls. For example, referring to Table 1, if a stealth attack is detected as launched by one or more humans who evenly distribute calls through multiple proxy servers, the VPA may request a call back number to prevent such calls from reaching the protected endpoint (e.g., the IP phone 212). Such call back numbers may be separately analyzed to take predefined action.

Referring again to FIG. 3, in another embodiment, the method 300 may be used to allow legitimate traffic while blocking a DoS attack (from, for example, zombie machines). In step 302, the method 300 waits for a period of time $\Delta t$. A message (e.g., a SIP INVITE message) may be received, at which time the traffic velocity may be calculated in step 304 as previously described. The traffic volume from a particular source may be tracked, for example, by incrementing a counter for each message received from the source. In steps 306, 308, and 310, the average acceleration is calculated and a determination is made as to whether the number of calls (as stored in the counter) received from the source is greater than a predefined threshold. If the number of calls exceeds the threshold, the method 300 adds a policy to a firewall or other security device to block the source in step 312.

More specifically, after detection of a flood-based DoS attack in step 310, a dynamic blocked list (e.g., a DoS cache) may be created to store information about end-points that are identified as sources of the on-going attack. The identification of an endpoint may be based on criteria such as: a trust level of the source, the time between two consecutive transaction initiation attempts from a source, the difference between the number of transaction initiation attempts and the number of transaction termination attempts from a source, and whether any suspected activity has been recorded from that source in the recent past. The behavior of a source during a flood-based DoS attack may be characterized in terms of the above parameters. A source is put into the DoS cache if the time between two successive transaction initiation requests from that source is less than a predetermined threshold, or if the difference between the number of transaction initiation attempts and transaction termination attempts from that source is more than a predetermined threshold.

Figure 8:
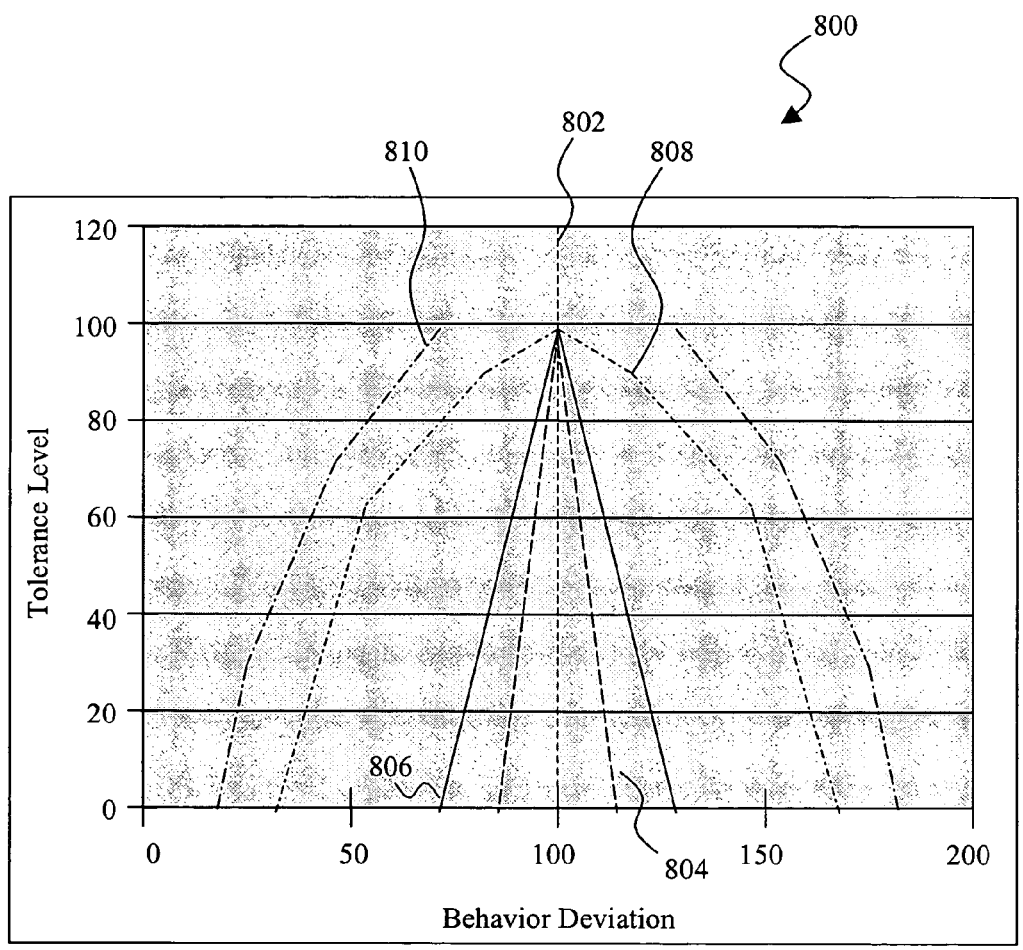
FIG. 8 is a graph illustrating multiple trust based tolerance levels that may be used with the methods of FIGS. 1 and 3.

With additional reference to FIG. 8, the characterization of a source may be modified using a trust level. For example, as illustrated by the graph 800 of FIG. 8, different allowable deviation amounts may be assigned to different trust levels. Normal behavior is defined by line 802 (with a behavior deviation of 100 (or 0%)). No trust is defined by lines 804, which indicate that very little deviation from normal behavior is needed before the tolerance level starts falling. Low trust is defined by the lines 806, while an identity-based trust level (e.g., sources on a trusted caller list) is defined by lines 808. Lines 810 indicate cryptographic trust and are allowed the highest tolerance for deviation. Accordingly, tolerance towards behavior by the source is based on the trust level of that source and is directly proportional to the trust level. This serves to reduce the rate of false positives and minimizes the occurrences of legitimate traffic being blocked as a DoS attack.

A hotel reception desk may be used as an example of an implementation of such a trust level. Although the desk will normally generate a certain amount of outgoing traffic during business hours, this traffic may peak at particular times. For example, during a period of time in the morning, traffic may increase as the desk personnel place wake-up calls to hotel guests. If the system does not expect these calls, it may view it as an attack from a particular source (the desk). Accordingly, a trust level may be assigned to the desk to allow such deviations.

It is understood that trust levels, trusted caller list additions, and similar modifications may be restricted to certain times. For example, the amount of deviation that the hotel reception desk is allowed may be greater in the morning when the traffic is expected to increase, and may be lowered during the day and at night to prevent use of the hotel desk's communication facilities for DoS attacks.

Referring again specifically to FIG. 3, the firewall policy may be implemented to expire within a certain period of time (e.g., the DoS cache entries may be deleted) or may implemented to remain in force until cancelled. If the number of calls does not exceed the threshold (as determined in step 310), then the method may continue to step 316 and allow the call. Accordingly, the method 300 may be used to monitor source behavior in conjunction with anomaly detection. A short term cache may be used to hold dynamically identified attack sources and to allow identification of legitimate calling parties. This enables the method 300 to service legitimate calls during a flood-based DoS attack.

Figure 9:
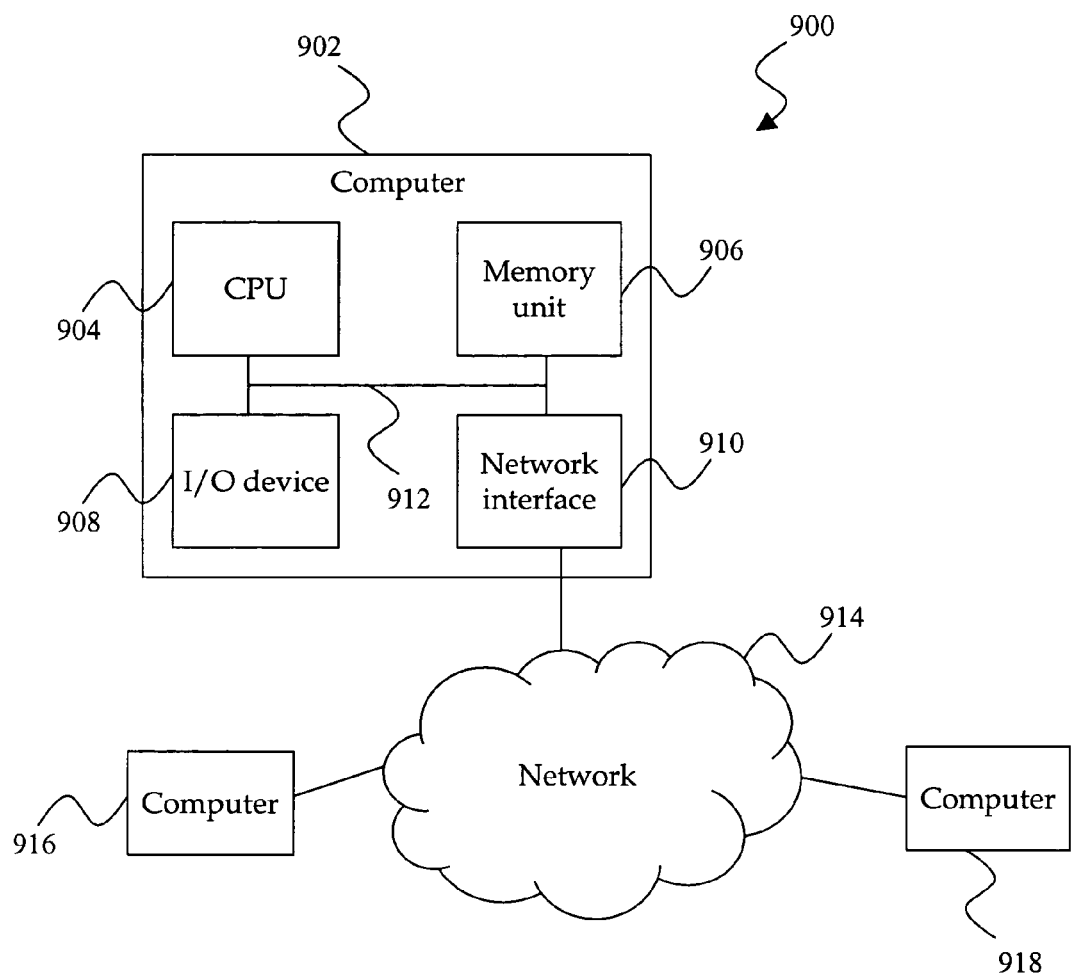
FIG. 9 is a diagram of another exemplary communications environment within which the methods of FIGS. 1 and 3 may be executed.

Referring now to FIG. 9, in another embodiment, an exemplary computer environment 900 is illustrated. The computer environment includes three computers 902, 916, and 918. For purposes of illustration, the computer 902 is illustrated in greater detail and may include a central processing unit ("CPU") 904, a memory unit 906, an input/output ("I/O") device 908, and a network interface 910. The network interface may be, for example, one or more network interface cards (NICs) that are each associated with a media access control (MAC) address. The components 904, 906, 908, and 910 are interconnected by a bus system 912. It is understood that the computer may be differently configured and that each of the listed components may actually represent several different components. For example, the CPU 904 may actually represent a multi-processor or a distributed processing system; the memory unit 906 may include different levels of cache memory, main memory, hard disks, and remote storage locations; and the I/O device 908 may include monitors, keyboards, and the like.

The computer 902 may be connected to a network 914. The network 914 may be, for example, a subnet of a local area network, a company wide intranet, and/or the Internet. Because the computer 902 may be connected to the network 914, certain components may, at times, be shared with the other computers 916 and 918. Therefore, a wide range of flexibility is anticipated in the configuration of the computer. Furthermore, it is understood that, in some implementations, the computer 902 may act as a server to other computers 916, 918. Each computer 902, 916, 918 may be identified on the network by an address (e.g., an IP address) and, in some instances, by the MAC address associated with the network interface of the relevant computer.

Instructions for executing various steps or for implementing various functions disclosed in the present description may be stored on any computer readable medium, including shared storage, one or more of the computers, or elsewhere. Users of the computers 902, 916, 918 may communicate using programs such as instant messaging programs. Such programs are also vulnerable to flood and stealth type DoS attacks, and the previously described methods may be used to detect and prevent such attacks occurring via instant messaging.

It is noted that the methods described herein may be applied to many different environments other than the VoIP and instant messaging environments described above. For example, such methods may be used to block call or text messaging attacks against cell phones, pagers, personal digital assistants, and similar devices. Systems supporting any device that may subject to such DoS attacks may benefit from the methods described herein.

While the preceding description shows and describes one or more embodiments, it will be understood by those skilled in the art that various changes in form and detail may be made therein without departing from the spirit and scope of the present disclosure. For example, various steps of the described methods may be executed in a different order or executed sequentially, combined, further divided, replaced with alternate steps, or removed entirely. In addition, various functions illustrated in the methods or described elsewhere in the disclosure may be combined to provide additional and/or alternate functions. Additionally, the various equations in the preceding description (e.g., equations for $A_n$ and $A_{avg}$) may be modified or replaced with other equations to provide similar or identical functionality. Therefore, the claims should be interpreted in a broad manner, consistent with the present disclosure.

What is claimed is:

1. A method for detecting attacks in a communications network, the method comprising: calculating first traffic volume of messages destined for one or more devices at a first sampling time and a second traffic volume of messages destined for the one or more devices at a second sampling time, respectively; calculating an average acceleration ($A_{avg}$), based on an acceleration ($A_n$) for sampling times wherein $A_{avg}$=(sum of each $A_n$)/n, $A_n=(1-\alpha)A_{n-1}++(V_n-V_{n-1})$, n is the second sampling time, n−1 is the first sampling time, $A_{n-1}$ is a previous acceleration, $V_n$ is the second traffic volume of messages, $V_{n-1}$ is the first traffic volume of messages, and $\alpha$ is a sensitivity factor ($0 \leq \alpha \geq 1$) enabling adjustment of the calculation for $A_n$; detecting the attacks by identifying whether the average acceleration has crossed a threshold; and servicing the plurality of messages only if the average acceleration has not crossed the threshold.

2. The method of claim 1 further comprising repeating the step of calculating the average acceleration for one or more subsequent traffic volumes.

3. The method of claim 1 further comprising:
   determining whether at least a portion of the plurality of messages received at the first and second times are authentic; and
   rejecting each message that is not authentic.

4. The method of claim 3 wherein determining whether at least the portion of the plurality of messages received at the first and second times are authentic includes sending a message to a source designated by each message to verify whether the source is correct.

5. The method of claim 1 further comprising, if the average acceleration has crossed the threshold, blocking at least a portion of the messages.

6. The method of claim 5 further comprising:
   identifying at least one source of the messages, wherein the at least one source is sending a majority of the messages that cause the average acceleration to cross the threshold; and
   blocking the messages only from the at least one source.

7. The method of claim 1 wherein traffic comprising the first and second traffic volumes is directed to a single device, and wherein the average acceleration is calculated on a device by device basis for a plurality of devices.

8. A method for detecting denial of service attacks against one of a plurality of network devices, the method comprising: sampling a current traffic volume ($V_n$) of messages for a network device at each of a plurality of sampling times (n); calculating an acceleration for each of the plurality of times, wherein each acceleration $A_n$ is calculated as $A_n=(1-\alpha)A_{n-1}+\alpha(V_n-V_{n-1})$, wherein $A_{n-1}$ is a previous acceleration $V_n$ is the current traffic volume of messages, $V_{n-1}$ is a previous traffic volume of messages, and $\alpha$ is a sensitivity factor ($0 \leq \alpha \geq 1$) enabling adjustment of the calculation for $A_n$; detecting the denial of service attacks by calculating an average acceleration ($A_{avg}$) based on each of the calculated accelerations ($A_n$); determining whether the average acceleration ($A_{avg}$) has crossed a threshold; and servicing the plurality of messages only if the average acceleration ($A_{avg}$) has not crossed the threshold.

9. The method of claim 8 wherein $A_{avg}$ is calculated as (sum of each $A_n$)/n.

10. The method of claim 8 further comprising permitting traffic to reach the network device only if $A_{avg}$ has not crossed the threshold.

11. The method of claim 10 further comprising, if $A_{avg}$ has crossed the threshold, blocking at least a portion of the traffic.

12. The method of claim 11 further comprising:
identifying one or more sources of the traffic that is causing $A_{avg}$ to cross the threshold; and
blocking the traffic only from the one or more sources.

13. The method of claim 12 further comprising:
determining a trust level of the one or more sources; and
blocking the traffic from the one or more sources only if the traffic's behavior deviates from a normal behavior standard by a predefined amount.

14. The method of claim 13 wherein the trust level is selected from a group comprising a no trust level, a low trust level, an identity-based trust level, and a cryptographic trust level.

15. The method of claim 13 wherein the trust level of the source is modified based on at least one of a time or a day.

16. A communications system comprising: a network device; a processor; a memory accessible to the processor for storing instructions for processing by the processor; and a plurality of instructions, including: instructions for calculating first traffic volume of messages destined for the network device and received at a first sampling time and a second traffic volume of messages destined for the network device and received at a second sampling time, respectively instructions for calculating an average acceleration ($A_{avg}$) based on an acceleration ($A_n$) for the sampling times wherein $A_{avg}=$ (sum of each $A_n$)/n, $A_n=(1-\alpha)A_{n-1}+\alpha(V_n-V_{n-1})$, n is the second sampling time n−1 is the first sampling time, $A_{n-1}$ is a previous acceleration, $V_n$ is the second traffic volume of messages, $V_{n-1}$ is the first traffic volume of messages, and $\alpha$ is a sensitivity factor ($0 \leq \alpha \geq 1$) enabling adjustment of the calculation for $A_n$;
instructions for identifying whether the average acceleration has crossed a threshold;
and instructions for permitting the plurality of messages to reach the network device only if the average acceleration has not crossed the threshold.

17. The system of claim 16 further comprising instructions for repeating the step of calculating the average acceleration for one or more subsequent traffic volumes.

18. A system for detecting denial of service attacks against one of a plurality of communication devices, the system comprising: a communications channel configured to carry traffic to the device; a security device accessible to the communications channel, wherein the security device comprises a traffic monitor and a firewall; the traffic monitor (a) sampling a current traffic volume ($V_n$) of messages for the device at each of a plurality of sampling times (n), (b) calculating an acceleration for each of the plurality of times, wherein each acceleration ($A_n$) is calculated as $A_n=(1-\alpha)A_{n-1}+\alpha(V_n-V_{n-1})$, wherein $A_{n-1}$ is a previous acceleration $V_n$ is the current traffic volume of messages, $V_{n-1}$ is a previous traffic volume ($V_{n-1}$) of messages, and $\alpha$ is a sensitivity factor ($0 \leq \alpha \geq 1$) enabling adjustment of the calculation for $A_n$, (c) calculating an average acceleration ($A_{avg}$) based on each of the calculated accelerations ($A_n$), and (d) detecting the denial of service attacks by determining whether the average acceleration ($A_{avg}$) has crossed a threshold; and the firewall permitting the messages to reach the device only if the average acceleration ($A_{avg}$) has not crossed the threshold.

19. The system of claim 18 wherein $A_{avg}$ is calculated as (sum of each $A_n$)/n.

20. The system of claim 18 wherein the traffic is voice-over-IP traffic.

21. The system of claim 18 wherein the traffic is instant messaging traffic.

* * * * *